April 11, 1967  H. G. MATHEWS  3,313,674
LAMINATE PANEL
Filed Oct. 2, 1962
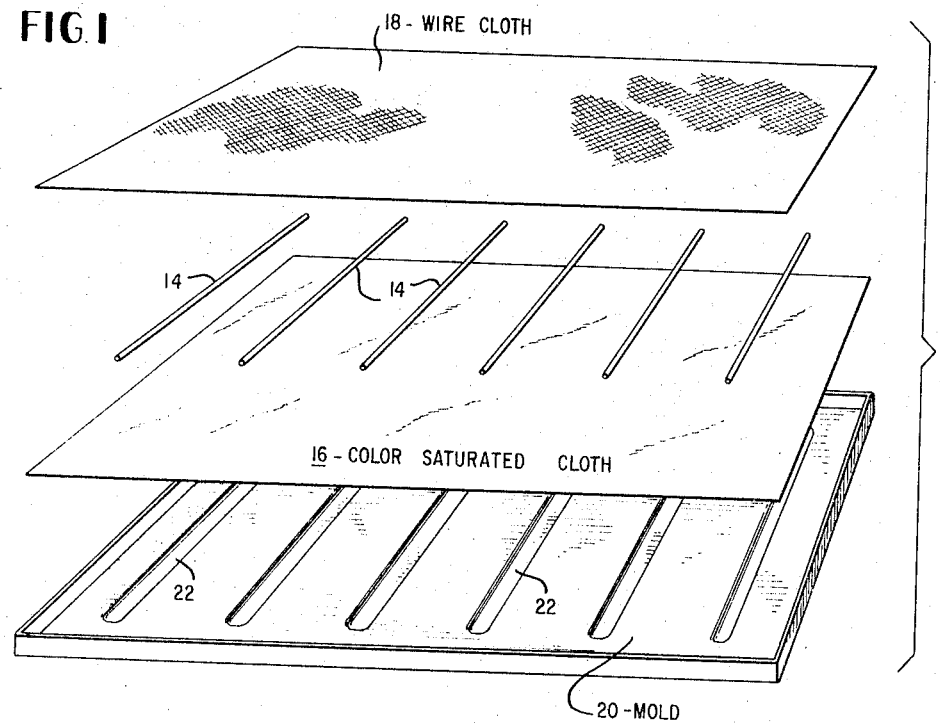
FIG. 1
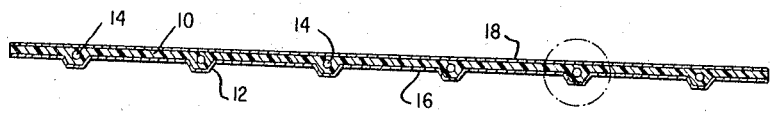
FIG. 2
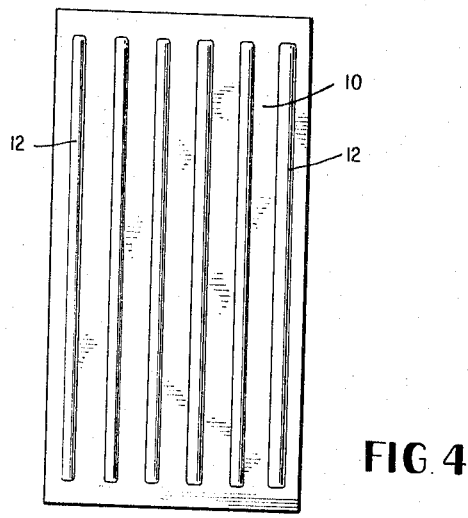
FIG. 4
FIG. 3
INVENTOR.
HOWARD G. MATHEWS
BY
Dicke & Craig
ATTORNEYS 3,313,674
LAMINATE PANEL
Howard G. Mathews, Levittown, N.J., assignor to Foam Products Corporation, Thomasville, Ga., a corporation of Georgia
Filed Oct. 2, 1962, Ser. No. 227,788
2 Claims. (Cl. 161—96)

The present invention relates to an improved laminate structural panel and to the method of producing the same. More particularly, a laminate panel in accordance with the present invention combines good insulating properties with high wear-resistant characteristics in an economical manner.

A laminate panel having such features is capable of a multiplicity of uses. For example, if the panel is utilized as an interior wall of a trailer or other transportation vehicle, the insulating properties of the panel are utilized to reduce refrigeration costs. The wear-resistant characteristics of the panel enable the panel to withstand abrasive wear and the like resulting from cargo striking against the panels due to motion of the vehicle. For example, a panel in accordance with the present invention is well suited for use in a meat-transporting vehicle wherein sides of beef having exposed bones may be swung against the interior of the vehicle during transportation.

One embodiment of the present invention consists of a laminate structural panel comprising an epoxy resin base portion, a color-saturated cloth embedded within said base portion, and a wire cloth embedded within the base portion adjacent one side thereof. The other side of the panel has projecting reinforcing ribs with rope-like fibre-glass rods positioned within the ribs. Such a panel represents an improvement over fibre-glass mats which have heretofore been used in making panels for transportation vehicles. A panel in accordance with the present invention has greater strength for the intended use than do panels embodying fibre-glass mats. The use of a wire cloth layer, which is preferably aluminum, not only reduces the weight of the panel, but also the wire cloth has greater impact strength than does fibre-glass. A panel produced in accordance with the present invention may weigh in the order of 0.5 pound per square foot as contrasted to presently utilized panels which normally weigh more than one pound per square foot. Since the average transportation trailer is 40 feet long, it will be appreciated that the weight savings are substantial.

Accordingly, one of the primary objects of the present invention is to provide an improved low cost laminate structural panel, especially for use in trucks, trailers, freezer rooms and refrigeration compartments.

Another object of the present invention is to provide a laminate structural panel combining good insulating properties with high wear resistant characteristics.

Still another object of the present invention is to provide a method of producing a laminate structural panel having good heat insulating properties and high wear resistant characteristics in an economical manner.

These and other objects, features and advantages of the present invention will become more apparent from the following description when taken in conjunction with the drawings, wherein FIGURE 1 is a substantially diagrammatic exploded view showing various components of the laminate panel being positioned in a mold, FIGURE 2 is a side view of a completed panel in accordance with the present invention, FIGURE 3 is an enlargement of the portion of FIGURE 2 circled in dot-dash lines, and FIGURE 4 is a bottom view on a reduced scale of the panel shown in FIGURE 2.

Referring now to the drawing, and more particularly to FIGURE 3, a completed panel includes an epoxy resin base portion 10 having at one side thereof a plurality of spaced reinforcing ribs 12, rope-like reinforcing rods 14 positioned within ribs 12, a color-saturated cloth 16 within the epoxy base portion adjacent to ribs 12, and a wire reinforcing cloth 18 embedded adjacent the other side of the panel.

The epoxy resin base portion 10 is effective to bond the above-mentioned elements in place. Suitable epoxy resins and hardeners therefor are well known in the art. The epoxy resin chosen is preferably one that is activated at a relatively low temperature, for example, 280° F. One suitable resin is sold under the trade name "Epon 815." The requisite heat for curing the epoxy resin is supplied during a molding operation as will be described hereinafter.

The ribs 12 perform the dual function of stiffening the panel, and of insuring that there will be air circulation in a completed enclosure between the inner surfaces of the panels and cartons or other goods stored adjacent thereto. Rods 14 are effective to reinforce ribs 12 and therewith to reinforce the entire panel.

Cloth 16 which may be cheesecloth or similar material is saturated with the color of the desired product. This procedure is followed since it has been found difficult to hold color dispersed within an epoxy resin. However, by providing cloth 16 saturated with the desired color, during the heat-curing process for the resin, the color from the cloth will be dispersed throughout the entire panel and thus avoid the aforementioned difficulty. If a white finish is desired, aluminum silicate or other suitable pigment is utilized to saturate the cloth. Cloth 16 will normally show up as a fine grain in the finished panel, and is also effective to hold the epoxy resin evenly distributed across the width and length of the panel.

Wire cloth 18 is preferably either aluminum or steel when the panels are to be used in transportation vehicles. Aluminum wire cloth is preferred due to its light weight. For most applications in transportation vehicles, an aluminum wire of approximately 20 to 25 M diameter would be sufficient.

A panel in accordance with the present invention may be produced in a suitable mold. In FIGURE 1, a suitable bottom mold form 20 is illustrated. Mold form 20 is provided with indentations 22 which are effective to form the ribs 12 in the finished panel. Indentations 22 do not extend the entire width of the mold so that ribs 12 in the finished panel terminate short of the ends of the panel as is evident in FIGURE 4. During manufacture of the panel, the color-saturated cloth 16 is initially placed upon mold form 20. A fibre-glass rod member 14 is then positioned upon cloth layer 16 within each indentation 22 in the mold form. The chemicals required for the production of the resin base portion 10 and the wire cloth reinforcing element 18 are then placed within the mold which is closed by a suitable upper mold form (not shown). Heat is applied to cure the resin which solidifies into a layer extending over and through cloth 16 and wire cloth 18.

Preferably a suitable filler such as emery dust is added to the resin before curing to produce a more wear-resistant finish.

An epoxy resin is preferably used due to its good adhesion to the wire cloth, especially to steel, as well as to fibre-glass. However, other resins as polyesters, phenolics and melamines could be used.

While a preferred embodiment in accordance with the present invention has been shown and described, it is apparent that the present invention is not limited to the specific details shown and described, but is susceptible to many changes and modifications without departing from the scope of the invention. For example, it is within the purview of the present invention to provide the edges of the panels with integral joint portions which may be interlocked with corresponding joint portions of adjacent panels by providing suitably contoured side mold forms. Accordingly, it is intended to encompass all such changes and modifications as fall within the scope of the appended claims.

I claim:
1. A laminate structural panel having high abrasion-resistant characteristics, comprising a base portion of epoxy resin, a wire cloth secured within said base portion adjacent to and spaced from one outer side thereof, a cloth secured within said base portion adjacent to and spaced from the other side thereof, said last-named cloth being effective to hold said epoxy resin evenly distributed across the width and length of said panel, said base portion at said other side having projecting ribs, and fibre-glass rods embedded in said ribs, said ribs having opposite ends thereof terminating adjacent respective ends of said panel, said last-named cloth extending through said ribs and forming portions thereof.
2. A laminate structural panel according to claim 1 wherein emery dust is disposed within said epoxy resin to impart increased abrasion resistance.

References Cited by the Examiner

UNITED STATES PATENTS

| | | | |
|---|---|---|---|
| 2,459,765 | 1/1949 | Black | 296—28.2 |
| 2,500,598 | 3/1950 | Axelrod | 264—229 |
| 2,545,981 | 3/1951 | Warp | 161—123 X |
| 2,688,580 | 9/1954 | Fingerhut. | |
| 2,758,952 | 8/1956 | Toulmin. | |
| 2,791,463 | 5/1957 | Levitt | 105—423 X |
| 2,830,925 | 4/1958 | Fennebresque. | |
| 2,836,529 | 5/1958 | Morris. | |
| 2,850,890 | 9/1958 | Rubenstein | 52—229 |
| 2,871,056 | 1/1959 | Levitt | 296—31 X |
| 2,921,463 | 1/1960 | Goldfein. | |
| 2,943,953 | 7/1960 | Daniel. | |
| 2,951,001 | 8/1960 | Rubenstein | 161—95 X |
| 2,962,323 | 11/1960 | McBride | 52—309 |
| 3,000,144 | 9/1961 | Kitson | 52—410 |
| 3,001,333 | 9/1961 | Piana | 52—586 X |
| 3,007,205 | 11/1961 | House | 264—47 |
| 3,030,255 | 4/1962 | Winston | 161—95 |
| 3,072,973 | 1/1963 | Barnette | 264—247 |
| 3,077,424 | 2/1963 | Maker. | |
| 3,163,434 | 12/1964 | Krueger | 296—31 X |

OTHER REFERENCES

Commercial Car Journal, February 1954, pages 82, 83, 130 and 131.

Roads and Streets, September 1959, page 141.

FRANK L. ABBOTT, *Primary Examiner.*

JACOB L. NACKENOFF, *Examiner.*

J. E. MURTAGH, *Assistant Examiner.*